US 8,548,619 B2

(12) United States Patent
Richey

(10) Patent No.: US 8,548,619 B2
(45) Date of Patent: *Oct. 1, 2013

(54) SYSTEM AND METHOD FOR AFTER-MARKET SUPPORT USING AS-BUILT DATA

(75) Inventor: Michael C. Richey, Camano Island, WA (US)

(73) Assignee: The Boeing Company, Chicago, IL (US)

(*) Notice: Subject to any disclaimer, the term of this patent is extended or adjusted under 35 U.S.C. 154(b) by 291 days.

This patent is subject to a terminal disclaimer.

(21) Appl. No.: 12/756,543

(22) Filed: Apr. 8, 2010

(65) Prior Publication Data

US 2010/0198383 A1 Aug. 5, 2010

Related U.S. Application Data

(62) Division of application No. 10/704,541, filed on Nov. 12, 2003, now Pat. No. 7,725,206.

(51) Int. Cl.
*G06F 17/50* (2006.01)

(52) U.S. Cl.
USPC ............ 700/98; 700/97; 700/108; 700/110; 427/9; 382/154; 342/424; 356/3.09; 356/28.5; 356/35.5; 345/8

(58) Field of Classification Search
USPC ............... 700/97, 98, 108, 119, 110; 427/9; 382/154
See application file for complete search history.

(56) References Cited

U.S. PATENT DOCUMENTS

| 4,370,721 A | * | 1/1983 | Berenberg et al. ............ 700/195 |
| 4,825,394 A | * | 4/1989 | Beamish et al. ............... 356/147 |
| 4,937,768 A | * | 6/1990 | Carver et al. ..................... 703/1 |
| 4,945,488 A | | 7/1990 | Carver |
| 5,023,800 A | | 6/1991 | Carver |
| 5,339,249 A | | 8/1994 | Schaeffer |
| 5,412,420 A | * | 5/1995 | Ellis .............................. 348/135 |
| 5,446,673 A | * | 8/1995 | Bauer et al. ................... 700/195 |
| 5,917,726 A | * | 6/1999 | Pryor ............................. 700/95 |
| 6,064,759 A | * | 5/2000 | Buckley et al. ............... 382/154 |
| 6,256,546 B1 | | 7/2001 | Graham |

(Continued)

FOREIGN PATENT DOCUMENTS

| GB | 2274526 | | 7/1994 |
| GB | 2327289 | * | 1/1999 |

OTHER PUBLICATIONS

US Patent and Trademark Office, "Notice 1337", Dec. 30, 2008, pp. 1.*
Verisurf, "Verisurf Products (visited Jun. 20, 2001)" pp. 15.*

(Continued)

*Primary Examiner* — Ryan Jarrett
*Assistant Examiner* — Olvin Lopez Alvarez

(57) ABSTRACT

A maintenance system for an assembly comprises a storage medium containing an as-built computer-aided design model of the assembly, a displaying means for displaying the as-built computer-aided design model, a metrology device for measuring a location of at least one characteristic of the assembly and creating as-built data regarding the location, and a replacing means for replacing a part of the assembly with a replacement part. The replacing means determines the location for the replacement part on the assembly by analyzing the as-built computer-aided design model and the data created by the metrology device.

17 Claims, 6 Drawing Sheets

(56) References Cited

U.S. PATENT DOCUMENTS

| | | | |
|---|---|---|---|
| 6,619,406 B1* | 9/2003 | Kacyra et al. | 172/4.5 |
| 6,662,071 B1* | 12/2003 | Jackson et al. | 700/159 |
| 6,778,911 B2* | 8/2004 | Opsal et al. | 702/27 |
| 6,781,683 B2* | 8/2004 | Kacyra et al. | 356/141.1 |
| 6,922,599 B2* | 7/2005 | Richey | 700/98 |
| 7,092,860 B1 | 8/2006 | Wasserman | |
| 2002/0044104 A1 | 4/2002 | Friedrich | |
| 2002/0072884 A1* | 6/2002 | El-Ratal | 703/2 |
| 2002/0113784 A1 | 8/2002 | Feilmeier | |
| 2002/0128784 A1* | 9/2002 | Scheiner et al. | 702/57 |
| 2003/0033041 A1* | 2/2003 | Richey | 700/98 |
| 2003/0204285 A1 | 10/2003 | Thomas | |
| 2004/0008353 A1* | 1/2004 | Chu | 356/636 |
| 2004/0039259 A1* | 2/2004 | Krause et al. | 600/300 |
| 2004/0083024 A1* | 4/2004 | Wang | 700/195 |
| 2004/0088138 A1* | 5/2004 | Mann | 702/175 |
| 2004/0119662 A1* | 6/2004 | Dempski | 345/8 |
| 2004/0189944 A1* | 9/2004 | Kaufman et al. | 352/10 |
| 2004/0252288 A1* | 12/2004 | Kacyra et al. | 356/3.09 |
| 2005/0107963 A1* | 5/2005 | Campbell | 702/42 |
| 2006/0155402 A1 | 7/2006 | Read | |

OTHER PUBLICATIONS

Solid Solutions, "PROCAM", May 29, 2009, pp. 8.*
The Boeing Company, "Using Real time, 6D Object Tracking to assemble Large Aerospace Components", 2000, pp. 10.*
Stephan et al, "Interactive Modelling of 3D-Environments", Sep. 2002, IEEE, pp. 530-535.*
Heinz et al, "Semi automatic 3D CAD model generation of AS built conditions of Real environments using a visual laser radar", 2001, pp. 400-406.*
Modern machine Shop, "Shop Floor Metrology on the Move", Jan. 31, 2001, pp. 7.*
Michael C. Richey, "Computer Aided-Design-Manufacturing & Measurement Itnegration", (2001) http://www.kinematics.com/library/CMSC_CMM I-PaperR2.pdf.
Yonghoon Kim et al., "Validation of 3-D Curved Objects: CAD Model and Fabricated Workpiece," Feb. 1, 1994, pp. 125-131, IEEE Transactions on Industrial Electronics. vol. 41, No. 1.
Pramod N. Chivatye et al., "Solid-Model Generation From Measured Point Data," Sep. 1, 1993, pp. 587-600, Computer-Aided Design, vol. 25, No. 9.
Desktop Engineering Online. "CADdoctor Dedicated to Data Translation." Section entitled "What About Step?" <http://www.deskeng.com/articies/aaagts.htm>. last visited Apr. 21, 2009.
PC Magazine Encyclopedia, Parametric Modeling, <http://www.pcmag.com/encyclopedia_term/0,2542,t=parametric+modeling&i=48839,00.asp>, last visited Sep. 20, 2011.

* cited by examiner

SYSTEM AND METHOD FOR AFTER-MARKET SUPPORT USING AS-BUILT DATA

CROSS-REFERENCE TO RELATED APPLICATIONS

This present application is a divisional of and claims priority to pending application Ser. No. 10/704,541 (now U.S. Pat. No. 7,725,206) entitled SYSTEM AND METHOD FOR MANUFACTURING AND AFTER-MARKET SUPPORT USING AS-BUILT DATA filed on Nov. 12, 2003, the entire contents of which is incorporated by reference herein.

FIELD

The present disclosure relates generally to large scale integrated manufacturing systems. More particularly, the present disclosure relates to manufacturing systems using metrology devices and three-dimensional interactive computer software.

BACKGROUND

In many large-scale manufacturing contexts, assembly precision is a fundamental requirement to maintain the engineering design intent, and for certification, by a customer or a government agency, that the manufactured product is fit for its intended use. Currently, large-scale manufactured items, and subassemblies for such items, are designed using computer-aided design (CAD) and/or computer-aided manufacturing (CAM) software. This software typically allows for product design modeling in three-dimensional (3D). The 3D design is then converted to standard orthogonal two-dimensional drawings (2D), which is, from then on, considered the official "authority for manufacturing".

From the 2D engineering drawings, monolithic Floor Assembly Jigs and applied tooling fixtures, e.g. drill & locating jigs, are designed and built. The detail parts and subassemblies configuration is maintained and the tool becomes the control media to insure engineering configuration is achieved. Because the jigs and tools are often fixed, and the parts must be assembled while attached to the tool, adherence to the engineering design standards, within a specific tolerance, is maintained.

However, this manufacturing process poses several disadvantages. Significant resources are often spent creating the 3D models, which are often not used after the 2D conversions are created. The historical reason for converting 3D models to a 2D drawing format is the inability to link tolerance attributes to the three-dimensional models. Currently, the three-dimensional model are projected into convention 2D orthogonal views and dimensioned.

Additionally, both the 3D models and 2D drawings are theoretical, and do not reflect the influences of the manufacturing process, which may change the dimensions of the part or subassembly so that they differ from the theoretical, while being within the acceptable manufacturing tolerance. A number of aspects of the manufacturing process can lead to differences between the theoretical model and the as-built configuration, including product component tolerance build-up, free state versus restrained part condition, manufacturing process assembly variation, fastener-induced distortion, high interference and cold working, environmental factors such as temperature and vibration, inconsistencies in the manufacturing process, and fabrication variables such as cutter deflection.

None of these environmental factors can be evaluated when the part or subassembly is designed using the CAD software. For this reason, the 3D and 2D drawings become inaccurate representations of the parts, subassemblies, or installations, as it is actually built. If compliance with governmental or customer standards is measured against theoretical drawings, manufacturers will be unnecessarily non-compliant too often. Also, this system requires ongoing quality control, to make sure the tools, the parts, and the subassemblies comply with the specification, within the allowable engineering tolerance.

Accordingly, it is desirable to provide a system and method for manufacturing that uses as-built data in computer models and/or drawings.

BRIEF SUMMARY

The foregoing needs are met, to a great extent, by the present invention wherein, in an aspect, a system is provided that, in embodiments, measures as-built data of a three-dimensional assembly and/or part using a metrology device. The system feeds the as-built data information into a computer-aided design change propagation system for use in creating improved schematics and for use in after-market support.

In accordance with an embodiment, a system for manufacturing an assembly is disclosed. The system may contain a metrology device for measuring parametric characteristics of the part, assembly or installation and creating data regarding the location. A computer-readable storage medium may store a first theoretical computer-aided design model for the assembly and/or a theoretical authority three-dimensional model for the assembly. A computer-aided design system may be connected to the metrology device and to the relational database medium with a unified communications link. The computer-aided design system may obtain data from the metrology device, and the computer-aided design system may morph a second as-built design model reflecting the data and the first computer-aided design model, or may modify the theoretical computer-aided design model to reflect the as-built data.

The system may optionally include a statistical analyzer for determining and automatically dispositioning the standard Cartesian X, Y, Z deviation or variance of the data for a plurality of like assemblies. The standard deviation and variance data may be used to create a new theoretical authority model for the assembly. Optionally, the system may be implemented without monolithic tooling fixtures. Optionally, the system may be capable of comparing the modified theoretical computer-aided design model, or the second computer as-built model, with the first computer-aided design model to determine whether the spatial location of the characteristic is within a tolerance. In a preferred embodiment, the storage medium may store the aforementioned information in a relational database.

In accordance with a further embodiment, a maintenance system for an assembly is disclosed. The system may contain a storage medium containing a theoretical computer-aided design model of the assembly, a displaying means for displaying the computer-aided design model, a metrology device capable of measuring the location of at least one characteristic of the assembly and creating modeling data regarding the Cartesian location, and a replacing means for replacing a part of the assembly with a fixed tooling. The replacing means is capable of determining the spatial location for said replacement part on the assembly by contextual linking the computer-aided design model and the as-built manufactured data created by the metrology device to information stored on a storage medium, optionally in the form of a unified relational database.

Optionally, the computer-aided design model reflects as-built data created using the metrology device or another metrology device capable of measuring the location of at least one characteristic of the assembly and creating data regarding said location. Optionally, the displaying means can be an augmented-reality mask, which can display the actual as-built assembly, the actual part to be replaced in the assembly, and synchronization of where the actual part should be placed within the assembly based on the as-built computer-aided design model. Optionally, the system may be implemented without a tooling fixture for quality assurance The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

The features of the present disclosed embodiments will become more apparent upon reference to the drawings wherein like numbers refer to like parts throughout and wherein.

DETAILED DESCRIPTION

Figure 1:
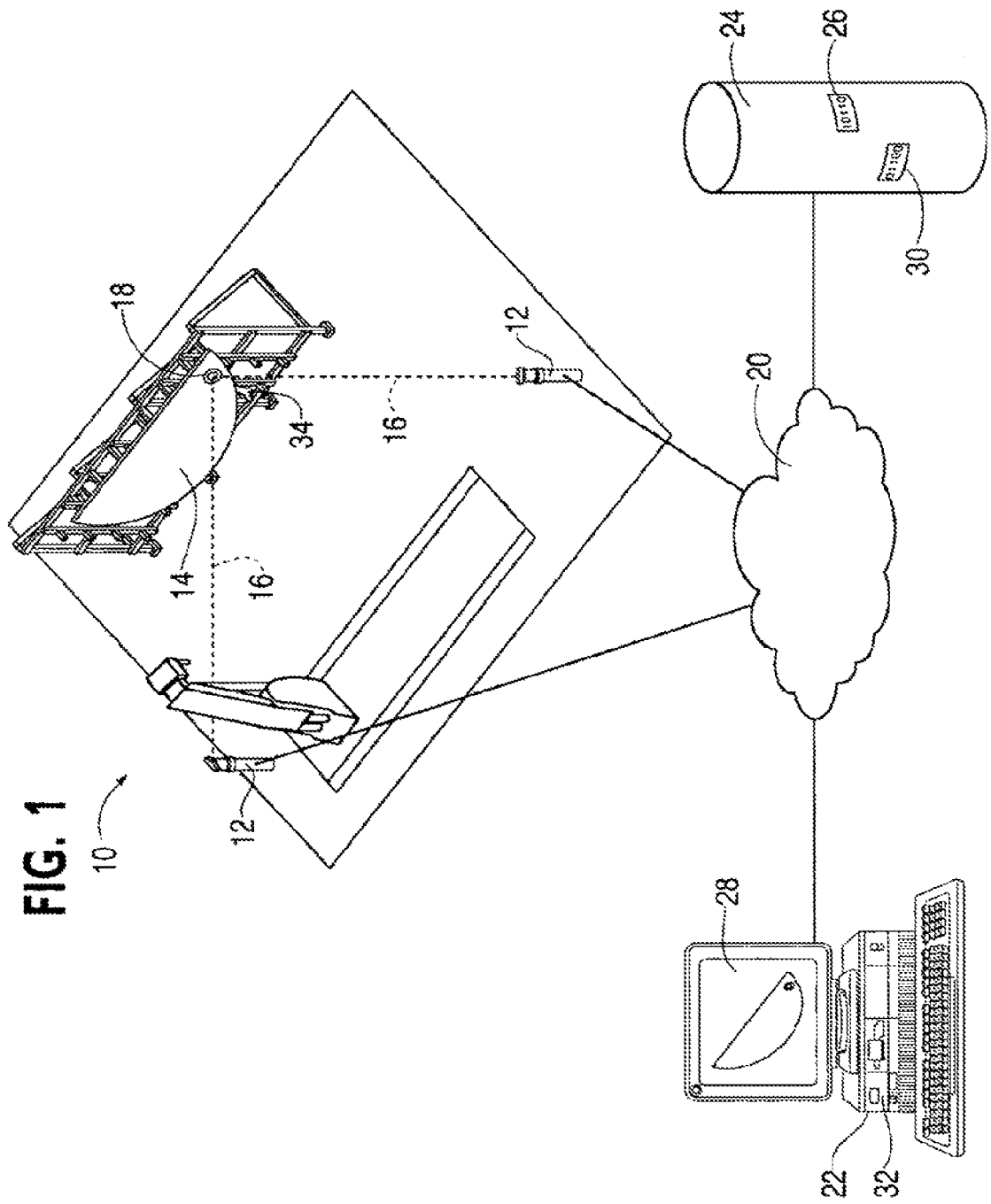
FIG. 1 is a system diagram illustrating a manufacturing system according to a preferred embodiment.

Preferred embodiments of the present disclosure will now be described with reference to the drawing figures. The embodiments of the present disclosure are discussed in the context of aircraft manufacture. However, it is understood that the disclosure is directed toward manufacturing in general and is not limited to the manufacturing of aircraft.

An embodiment of the disclosure provides a manufacturing system for an assembly in which as-built data for the assembly is fed back into the CAD/CAM system for use in creating new CAD models reflecting the as-built data. With the as-built data on hand, new authority models can be created which more accurately reflect the environmental realities involved in large-scale assembly manufacturing. Once these authority models are institutionalized within a predefined acceptable statistical range, they can be stored and utilized by large scale systems integrators, governmental agencies or customers as the specification for the assembly to be delivered by the manufacturer. Having more accurate authority models allows the manufactured products to conform to the as-built authority models more efficiently which reduces time for heavy maintenance and repair, airplane on ground and general costs related to non-conformance.

Additionally, in a preferred embodiment, having an accurate as-built model allows the assembly to be built in some instances without tool fixtures because the authority model will inform persons or machines performing the manufacturing task whether the alteration being made to the assembly is within the acceptable tolerance. Therefore, tooling fixtures need not be in place because the metrology device can compare the change about to be made with an accurate authority model and determine if the change is being made within the acceptable tolerance. In this instance, the tooling fixture becomes a simplified holding fixture without the rigorous tool routine maintenance and configuration requirements currently imposed.

Furthermore, in a preferred embodiment, the as-built data can be used for aftermarket support including maintenance, repair and operation (MR&O), and airplane-on-ground (AOG) scenarios which occur after a catastrophic event during which large tooling fixtures are not available, (i.e., on an airport runway). When the person or machine performing the MR&O or the AOG repair has the 3D CAD model containing the as-built data as measured by a metrology device during or immediately after manufacture, that person can access through the relational database the precise location where replacement parts were installed, for example, because the person knows where the part being replaced was located when the assembly was built.

In this manner, a significant amount of engineering time can be saved because, for example, a repair engineer trying to replace a missing hinge fitting does not need to fight the difference between the defined theoretical location and the actual as-built location to determine where the fitting hinge-line should go. The original spatial location was based on a theoretical model that did not indicate the actual location of the hinge centerline and which may have mislocated based on as-built or other manufacturing influences. For example, the fitting attach hole pattern may be drilled in a location, or at an angle, that is not the exact theoretical location or angle, but is within an acceptable tolerance of theoretical drawing tolerances. The repair engineer, using this embodiment, instead has an actual 3D model of the as-built data, complete with the imperfect as-built location, and therefore can know more accurately where to place the hinge fitting and attachment hole patterns.

An embodiment of the disclosed system and method is illustrated in FIG. 1, which shows a manufacturing system 10 containing a metrology device 12. The metrology device 12 measures characteristics of an assembly 14 which is being manufactured. The metrology device 12 can be a contact metrology device or a non-contact scanning metrology device. In either case, the metrology device 12 uses laser beams 16 to track the characteristics of the assembly 14 in a three-dimensional Cartesian space. Although the metrology device uses lasers in a preferred embodiment, other types of metrology devices, that may not use lasers or laser beams, can also be used (e.g., photogrammetry), rotating lasers.

For example, where a hole 18 exists in the hinge assembly 14, the metrology device 12 scans the assembly 14 using the laser beams 16, and discovers the hinge centerline 18 in the assembly 14. The metrology device measures the x, y, and z coordinates of the hole 18, with respect to a parametric reference point within the as-build three-dimensional model (not labeled) on the assembly 14. This information is then parameterized and imported through a contextual link and synchronized over a communications link 20 through a relational database at a product-lifecycle-management (PLM) system 22. Some additional details of the parameterization are contained in U.S. patent application Ser. No. 09/928,583 by Michael C. Richey, filed Aug. 13, 2001, entitled "System and Method for Producing an Assembly by directly Implementing Three-Dimensional Computer-Aided Design Component Definitions," the entire contents of which is incorporated herein by reference.

The communications link 20 is preferably a TCP/IP network, but can be any medium that is used to communicate data, and includes, but is not limited to, wired Ethernet, 802.11x wireless communications channels (e.g., "Wi-Fi"), Bluetooth™ wireless communications channels, or satellite communications channels, and can be direct communication, or communication via a distributed network, such as the Internet. In a preferred embodiment, the PLM system 22 is a desktop, notebook, or other computer with PLM software installed. The PLM software can be any software that is capable of performing the functions described herein. In a preferred embodiment, the software is a suite of products from Dassault Systems S.A. of Suresnes Cedex, France. Dassault's software suite includes Version 5 of the CATIA CAD tool, which is capable of altering CAD models based on raw data that is input into the system. The Dassault suite also includes ENOVIA and DELNIA. ENOVIA is a Product Data Management (PDM) system that enables the creation of dynamic, knowledge-based products, processes, and resources. It enables the creation of dynamic, knowledge-based products and processes that drive optimized product definition, manufacturing preparation, production and service.

The PLM software also has the ability to store tolerance information for each component of the assembly being designed or built. For example, if the theoretical model of the assembly 14 states that a fitting location 18 should be at specific coordinates (x, y, z), so that a hinge 34 can be inserted therein. The PLM software is capable of storing data reflecting the opinion of the designer or manufacturer that, if the x coordinate of the feature 18 is within + or −0.010 millimeters of theoretical x, the y coordinate of the feature 18 is within + or −0.005 millimeters of theoretical y, and the z coordinate of feature 18 is within + or −0.015 millimeters of theoretical z, the fitting 18 is said to be within an acceptable "tolerance." The PLM software can store this relational tolerance information for each characteristic of the assembly 14, of which the hinge fitting and attach hole pattern 18 is an example.

The system 10 also contains a storage medium 24 containing a relational database 26. In a preferred embodiment, the storage medium 24 is a hard disk within a server, but can include other computer-readable storage media, including hard drive, CDs, DVDs and flash media. The storage medium 24 containing the relational database 26 is coupled to the PLM as-built models 22 by a communications link 20. The relational database can be within the PLM system 22, in which case the communications link 20 between the PLM system 22 and the as-built model 24 is an IDE cable or another cable used to connect media drives to computer PLM and metrology systems. Alternatively, the storage medium 24 can be stored in a different location from the PLM system, as its own computer system or within a separate computer system, in which case the communications link 20 between the PLM system 22 and the storage medium 24 is any communications link used to communicate between computer systems, which is preferably a TCP/IP network, but can be any medium that is used to communicate data, and includes, but is not limited to, wired Ethernet, 802.11x wireless communications channels (e.g., "Wi-Fi"), Bluetooth™ wireless communications channels, or satellite communications channels, and can be direct communication, or communication via a distributed network centric, such as the Internet.

The storage medium 24 contains a relational database 26 containing a theoretical model of the assembly 14 or any number of sub-assemblies (not shown) of the assembly 14. The relational database corresponding to this theoretical model 26 can be unified and contextually linked to the CAM software and the as-built data can be federated into the PLM system 22, and can be graphically displayed on a display means 28 at the manufacturing site, or at other places. The display means 28 can be any apparatus capable of displaying video from a computer, and may or may not include the computer generating the display. The data also contains the tolerance information described above, for each characteristic of the assembly. Because the PLM system has access to the theoretical 3D CAD model data for the assembly, the person or machine performing the manufacturing step can determine whether the step he, she, or it is about to perform, i.e. drilling a hole, conforms with the theoretical design, within acceptable tolerance.

Additionally, the relational database 26 also contains a 3D CAD model 30 of the actual assembly 14 reflecting the as-built data collected by the metrology device 12. After a manufacturing step has been performed, i.e. a hole 18 has been drilled; the metrology device 12 measures the new characteristic of the assembly and converts that information to data. This contextual data is imported along the communications link 20 to the PLM system 22 which merges this data with the as-built 3D CAD model 30, either updating that model or creating a new model, which reflects the as-built data, including the change just made.

After a statistically significant sample of the same or similar assemblies have been manufactured and measured using the system 10, a statistical analyzer 32 can be used to compare the as-built data for each assembly. These models, and the original theoretical model if it existed, can be used to form a new institutionalized as-built authority model. This model will more accurately reflect the manufacturing process, because it will take into account the as-built data, which reflects any miscalculations made during the design phase that were due to the design software's inability to take manufacturing realities into account. More accurate as-built authority models can be used in future negotiations or agreements with customers or governmental regulatory bodies. With as-built data driving the authority model, the manufacturer is less likely to suffer the penalties and costs of non-conformance with the authority model. This in turn will open market application for service after sales and heavy maintenance and repair opportunities.

In the example where a hinge fitting 34 will be inserted into located 18, the as-built data for the location and orientation of fitting 18 will be valuable. The person or machine responsible for locating the fitting will be able to know the as-built location of the fitting 18, and will not be forced to look to an outdated theoretical model, and experiment with orientations of fitting 34 in order to accurately locate the fitting into its original as-built location. Having the precise Cartesian coordinates of hole 18, in visible form viewable in the display means 28, the person or machine will be able to match the fitting location exactly, on the first attempt. Utilizing the as-built data to locate part to part indexing—determining where one part goes in relation to another part, decreases engineering time spent on the manufacturing process.

Figure 2:
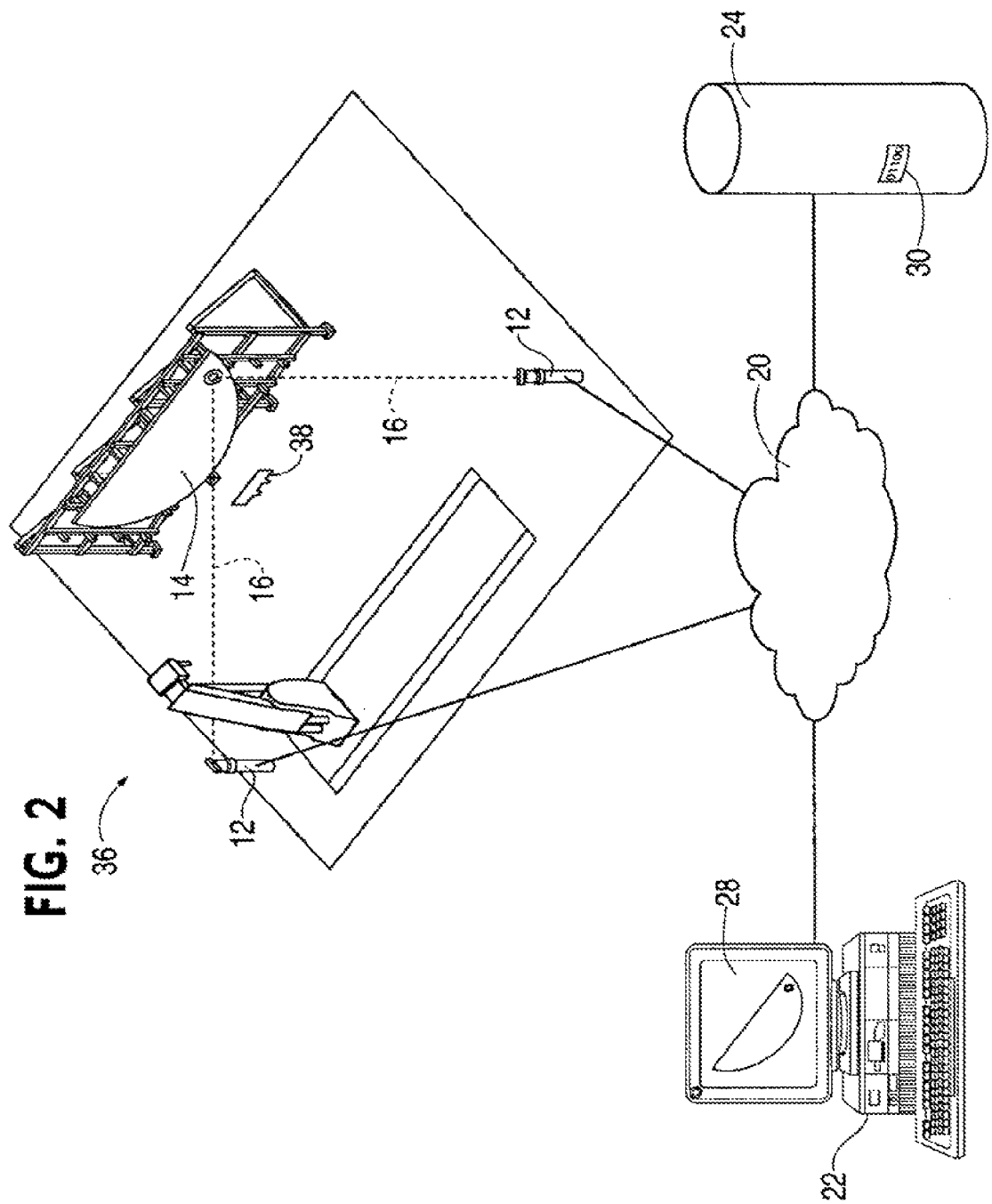
FIG. 2 is a perspective view of an alternative embodiment.

For each particular assembly, the as-built model created during the manufacturing process can be used for a number of after-market support functions, including scheduled Maintenance Repair and Operation (MR&O) and unscheduled Airplane on Ground (AOG) maintenance. Referring now to FIG. 2, a system for maintenance 36 is shown. A metrology device 12 is shown, and is coupled to a PLM system 22 and a display means 28. The metrology device and the PLM system are similar to those shown in FIG. 1. Additionally, a storage medium 24 is shown, containing the as-built 3D model of the particular assembly 30. If a part 38 has come apart from the assembly or has been damaged and needs replacement, the as-built 3D model will disclose, to the person or machine responsible for performing the maintenance, the precise location of the original part that the maintenance engineer or machine will be replacing.

In this manner, the maintenance engineer will have a visual aid in replacing part 38, and will not have to rely on the theoretical 3D drawings, which may not reflect the location of the part with enough specificity. Thus, maintenance and repair take significantly less time because of the reduction in touch labor. Additionally, maintenance can be performed in the field without a fixed tooling assembly because the model is the authority for repair, and the tooling assembly is no longer necessary. This can be accomplished by orientation of the metrology device to pre-defined engineering index features within the structure, clocking the as-built three-dimensional models and using the synchronized real-time data to perform maintenance activities. Additionally, this information could be federated from the relational database and embedded into the process engineering and maintenance simulation task.

Figure 3:
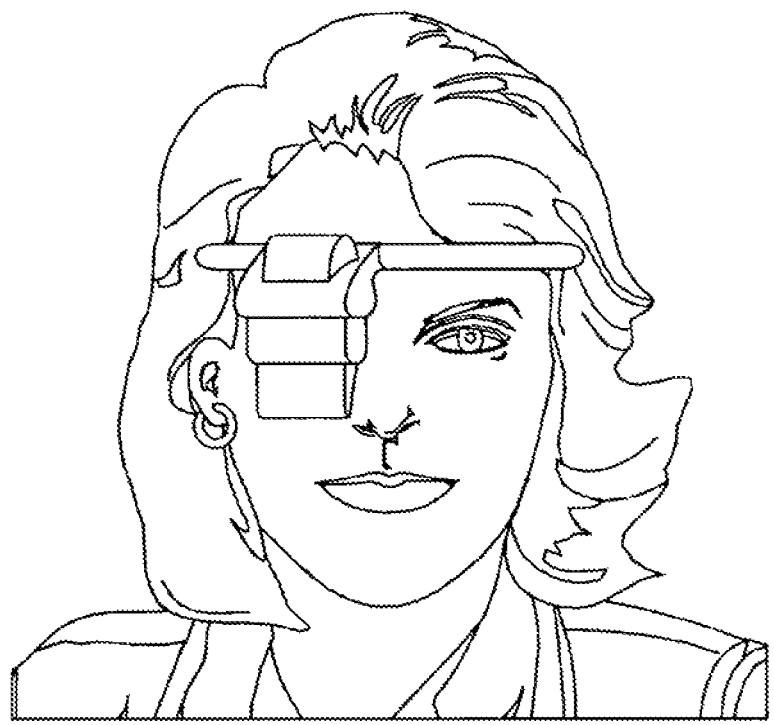
FIG. 3 is a part view of an alternative embodiment.

In an alternate embodiment of the system, the display means is an augmented reality device. An example of such a device is a Xybernaut wearable computer, from Xybernaut of Fairfax, Va. An exemplary augmented reality device is shown in FIG. 3. Looking through this augmented reality device, a manufacturing or maintenance engineer can look at the as-built 3D model, the actual assembly, and the replacement part, all at the same time. Using the 3D model, a maintenance engineer can replace a part by positioning the part near its intended location, until he receives a "lock on" notification in his augmented reality screen, to indicate that the replacement part is positioned exactly where the original part was during manufacturing. This makes single-person maintenance possible without the use of tooling fixtures, because the maintenance engineer has the authority for the maintenance in his field of view, and does not need a fixture to make sure that a replacement part is replaced in an appropriate place and orientation.

Figure 4:
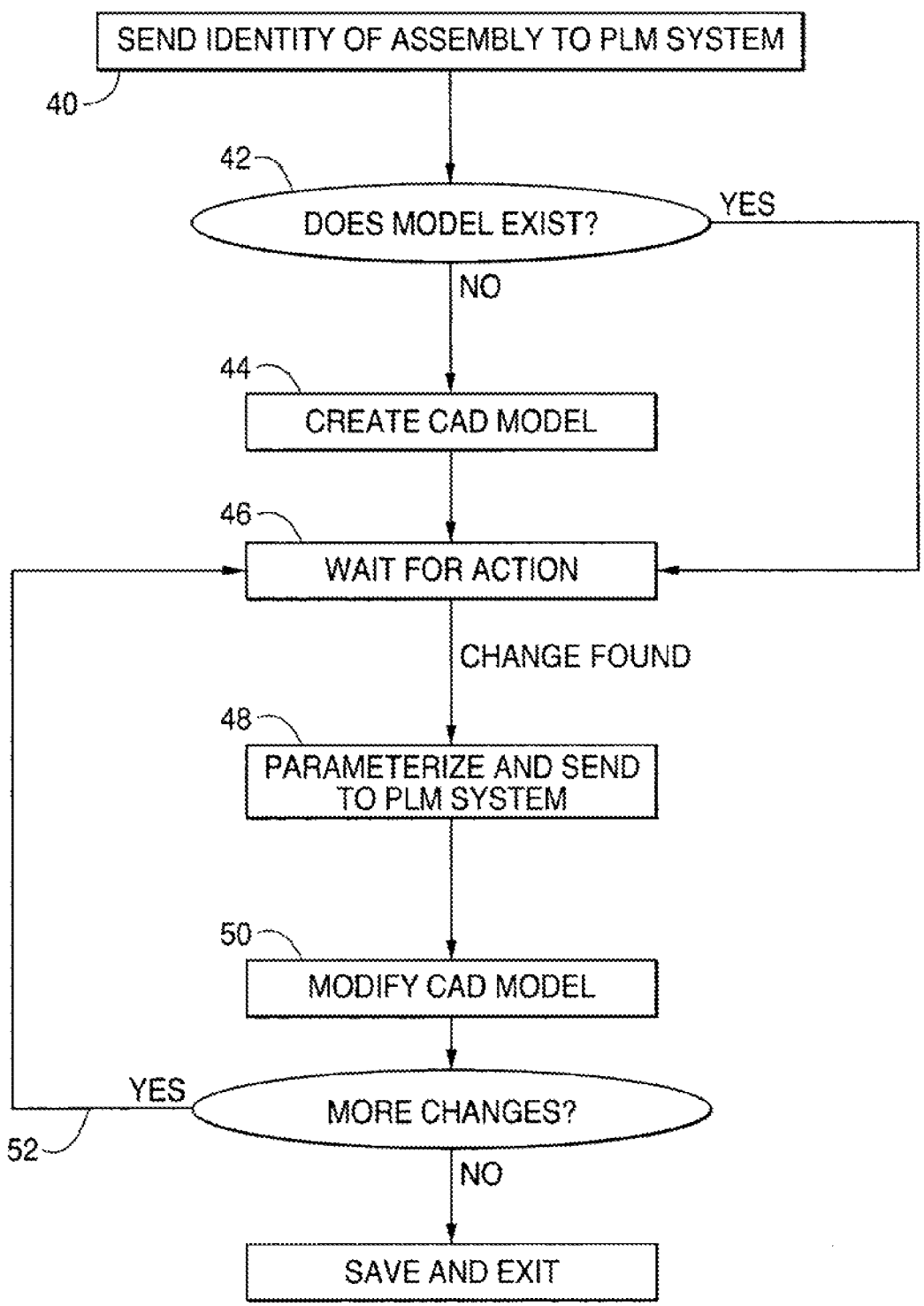
FIG. 4 is a flow diagram of an embodiment.

Referring now to FIG. 4, a flow diagram for a manufacturing process is shown. When an assembly is presented to a metrology device, the metrology device communicates the identity of the assembly to the PLM system 40. If the PLM system indicates that a CAD/CAM model containing as-built data does not exist for this assembly 42, the metrology device scans the assembly and creates a CAD/CAM model based on the locations of the various components and characteristics of the assembly 44. Once the CAD/CAM model exists (whether it was pre-existing, or it was just created using the metrology device), the assembly is now ready to have actions taken upon it that will change its structure, appearance, or other characteristics. When such an action is taken 46, the metrology device sends the change information to the PLM system 48. The PLM system then modifies the CAD/CAM model to reflect the change to the assembly 50. If there is another change made 52, the process is executed again. When all changes have been made, the CAD model reflects the final as-built data of the assembly. It can now be used in aftermarket support.

Figure 5:
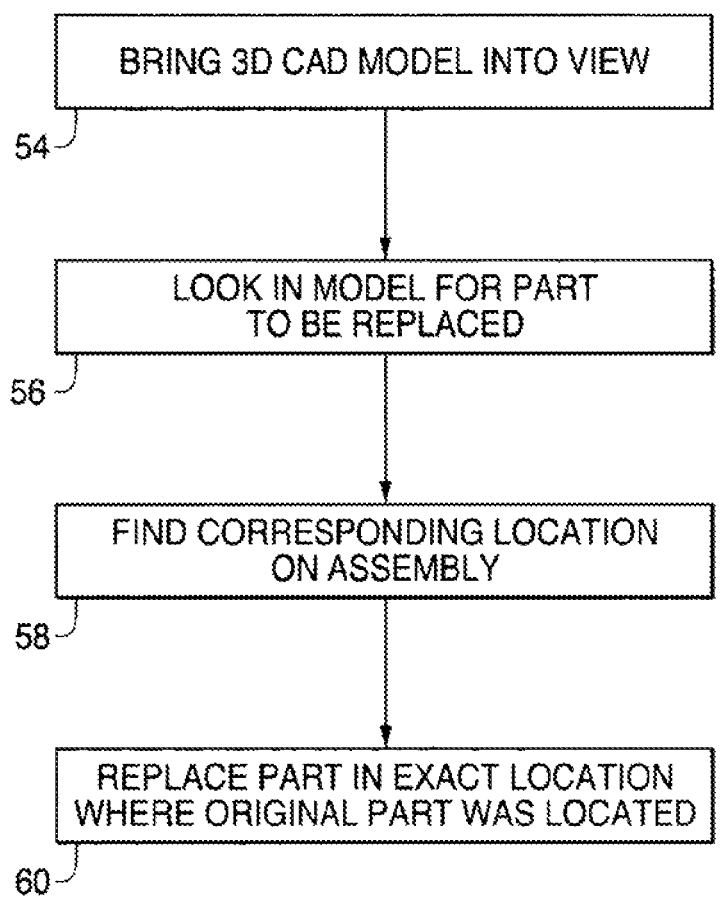
FIG. 5 is a flow diagram of an alternative embodiment.

Referring now to FIG. 5, a flow diagram for a maintenance process is shown. The as-built 3D CAD model is brought into the viewing means 54. From the as-built 3D CAD relational database, the special location of the replacement part is determined based on the location in the model of the part being replaced 56. The location of the original part is found on the assembly 58, and the replacement part is placed in that location by a person or a machine that can see or has access to the as-built CAD model, the actual assembly, and the replacement part 60.

Figure 6:
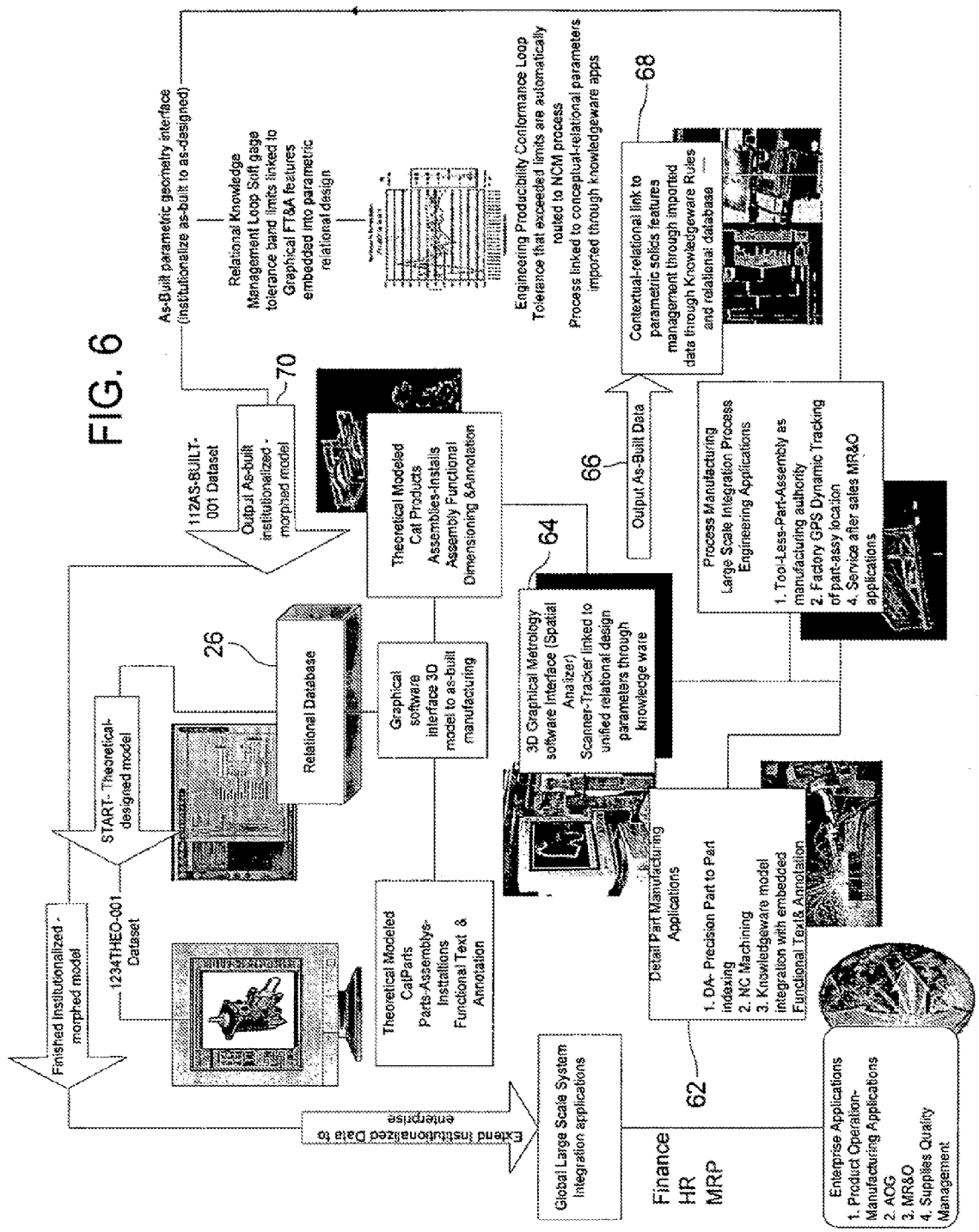
FIG. 6 is a flow diagram of an alternative embodiment.

Referring now to FIG. 6, a more detailed flow diagram is shown. The process begins with a theoretical model, of parts, assemblies, installations, including functional text and annotation 62. A 3D Graphical Metrology software Interface, including a Spatial Analyzer Scanner-Tracker is linked to unified relational design parameters through knowledgeware 64. By interfacing this spatial analyzer with the software interface, the as-built data can be measured 66. The as-built data then is output over a contextual-relational link to parametric solids features management through imported data through Knowledgeware Rules and a relational database 68. Next, an as-built parametric geometry interface institutionalizes as-built data to as-designed data 70. The as-built institutionalized morphed model is stored in a relational database 26. The finished institutionalized morphed model can be extended too many enterprise applications.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A maintenance system for an assembly, comprising:
 a metrology device for measuring a location of at least one characteristic of an as-built assembly relative to a parametric reference point of the as-built assembly and creating as-built parametric data regarding the location, the as-built parametric data comprising a relationship constraining the measured location of the characteristic relative to the parametric reference point;
 a storage medium containing an as-built computer-aided design model of the assembly reflecting the as-built parametric data of the as-built assembly obtained from the metrology device and representing the location of the characteristic relative to the parametric reference point, the as-built computer-aided design model containing data associated with a theoretical computer-aided design model of the assembly and imported into the as-built computer-aided design model, the as-built computer-aided design model being created in synchronized real-time reflecting the as-built parametric data of the as-built assembly; and
 a displaying means for displaying the as-built computer-aided design model.

2. The system of claim 1, wherein the as-built computer-aided design model reflects the as-built parametric data created using a second metrology device oriented to index features of the assembly.

3. The system of claim 1, wherein the displaying means comprises an augmented-reality device.

4. The system of claim 3, wherein the augmented-reality device displays an actual assembly, a replacement part to be replaced in the assembly, and a relationship of where the replacement part should be placed within the assembly based on the as-built computer-aided design model.

5. The system of claim 4, wherein the augmented-reality device comprises a wearable augmented-reality mask.

6. The system of claim 1 wherein information in the storage medium is provided in the form of a unified relational database.

7. The system of claim 6, further comprising:
 a computer-aided design system connected to the metrology device and to the unified relational database with a unified communications link;

the computer-aided design system obtaining the as-built parametric data from the metrology device and modifying the theoretical computer-aided design model to form the as-built computer-aided design model reflecting the as-built parametric data.

8. A method of maintenance for an assembly, the method comprising the steps of:
   measuring a location of at least one characteristic of an as-built assembly relative to a parametric reference point of the as-built assembly using a metrology device;
   creating as-built parametric data regarding the location of the characteristic, the as-built parametric data comprising a relationship constraining the measured location of the characteristic relative to the parametric reference point; and
   storing an as-built computer-aided design model of the assembly reflecting the as-built parametric data of the as-built assembly representing the location of the characteristic relative to the parametric reference point, the as-built computer-aided design model containing data associated with a theoretical computer-aided design model of the assembly and imported into the as-built computer-aided design model;
   creating the as-built computer-aided design model in synchronized real-time reflecting the parametric data of the as-built assembly; and
   displaying the as-built computer-aided design model;
   at least one of the above steps being performed by a processor.

9. The method of claim 8, wherein the displaying step comprises displaying the as-built computer-aided design model on an augmented-reality device.

10. The method of claim 9, wherein the augmented-reality device displays the actual assembly, a replacement part to be replaced in the assembly, and an indication of where the replacement part should be placed within the assembly based on the as-built computer-aided design model.

11. The method of claim 8, further comprising the steps of:
    obtaining the as-built data from the metrology device; and
    modifying the theoretical computer-aided design model based upon the as-built parametric data to form the as-built computer-aided design model.

12. The method of claim 11, wherein:
    the theoretical computer-aided design model is modified by a computer-aided design system connected to the metrology device by a unified communications link.

13. A non-transitory computer-readable medium comprising code executable by a computer for performing the steps of:
    measuring a location of at least one characteristic of an as-built assembly relative to a parametric reference point of the as-built assembly using a metrology device and creating as-built parametric data regarding the location, the as-built parametric data comprising a relationship constraining the measured location of the characteristic relative to the parametric reference point;
    storing an as-built computer-aided design model of the assembly reflecting the as-built parametric data of the as-built assembly representing the location of the characteristic relative to the parametric reference point, the as-built computer-aided design model containing data associated with a theoretical computer-aided design model of the assembly and imported into the as-built computer-aided design model;
    creating the as-built computer-aided design model in synchronized real-time reflecting the as-built parametric data of the as-built assembly; and
    displaying the as-built computer-aided design model.

14. The computer-readable medium of claim 13, wherein the displaying step comprises displaying the as-built computer-aided design model on an augmented-reality device.

15. The computer-readable medium of claim 14, wherein the augmented-reality device displays the actual assembly, a replacement part to be replaced in the assembly, and an indication of where the replacement part should be placed within the assembly based on the as-built computer-aided design model.

16. The computer-readable medium of claim 13, further comprising the steps of:
    obtaining the as-built parametric data from the metrology device; and
    modifying the theoretical computer-aided design model based upon the as-built data to form the as-built computer-aided design model.

17. The computer-readable medium of claim 16, wherein:
    the theoretical computer-aided design model is modified by a computer-aided design system connected to the metrology device by a unified communications link.

\* \* \* \* \*